(12) United States Patent
Kanevsky et al.

(10) Patent No.: US 8,484,024 B2
(45) Date of Patent: Jul. 9, 2013

(54) PHONETIC FEATURES FOR SPEECH RECOGNITION

(75) Inventors: Dimitri Kanevsky, Ossining, NY (US); David Nahamoo, Great Neck, NY (US); Bhuvana Ramabhadran, Great Neck, NY (US); Tara N. Sainath, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 269 days.

(21) Appl. No.: 13/034,293

(22) Filed: Feb. 24, 2011

(65) Prior Publication Data

US 2012/0221333 A1   Aug. 30, 2012

(51) Int. Cl.
*G10L 15/06* (2006.01)

(52) U.S. Cl.
USPC ............... 704/243; 704/9; 704/231; 704/244; 704/245

(58) Field of Classification Search
USPC ...................... 704/9, 231, 243–245
See application file for complete search history.

(56) References Cited

U.S. PATENT DOCUMENTS

| | | | |
|---|---|---|---|
| 7,139,708 B1* | 11/2006 | Olorenshaw et al. | 704/254 |
| 7,496,501 B2* | 2/2009 | Xun et al. | 704/9 |
| 7,593,940 B2* | 9/2009 | Gruhl et al. | 1/1 |
| 7,693,683 B2 | 4/2010 | Ihara | |
| 8,131,540 B2* | 3/2012 | Marchisio et al. | 704/9 |
| 2005/0038647 A1* | 2/2005 | Baker | 704/231 |
| 2006/0106596 A1* | 5/2006 | Weise | 704/9 |
| 2007/0061348 A1* | 3/2007 | Holland et al. | 707/100 |
| 2007/0150273 A1* | 6/2007 | Yamamoto et al. | 704/231 |
| 2008/0162386 A1 | 7/2008 | Rifkin et al. | |
| 2008/0270055 A1 | 10/2008 | Rozell et al. | |
| 2009/0024392 A1* | 1/2009 | Koshinaka | 704/257 |
| 2009/0326919 A1* | 12/2009 | Bean | 704/9 |

FOREIGN PATENT DOCUMENTS

| | | |
|---|---|---|
| JP | 02004163445 A | 6/2004 |
| JP | 02005227794 A | 8/2005 |
| JP | 02006235389 | 9/2006 |

OTHER PUBLICATIONS

Sainath et al. Bayesian Compressive Sensing for Phonetic Classification, IEEE 2010.
He et al. Tree-Structured Compressive Sensing with Variational Bayesian Analysis, IEEE Signal Processing Letters, vol. 17, No. 3, Mar. 2010.
Candes et al., Robust Uncertainty Principles: Exact Signal Reconstruction from Highly Incomplete Frequency Information. IEEE Trans. on Information Theory, 52:489-509, 2006.
Carmi et al. ABCS: Approximate Bayesian Compressed Sensing. Technical report, Human Language Technologies, IBM 2009.

(Continued)

*Primary Examiner* — Douglas Godbold
(74) *Attorney, Agent, or Firm* — Sunstein Kann Murphy & Timbers LLP

(57) ABSTRACT

Techniques are disclosed for using phonetic features for speech recognition. For example, a method comprises the steps of obtaining a first dictionary and a training data set associated with a speech recognition system, computing one or more support parameters from the training data set, transforming the first dictionary into a second dictionary, wherein the second dictionary is a function of one or more phonetic labels of the first dictionary, and using the one or more support parameters to select one or more samples from the second dictionary to create a set of one or more exemplar-based class identification features for a pattern recognition task.

21 Claims, 2 Drawing Sheets

OTHER PUBLICATIONS

Chartrand, Exact Reconstruction of Space Signals via Non-Convex Optimization. IEEE Signal Processing Letters, 14:707-710, 2007.

Deng et al. Use of Differential Cepstra as Acoustic Features in Hidden Trajectory Modeling for Phonetic Recognition. In Proc. ICASSP, 2007.

Deselaers et al. Speech Recognition with State-based Nearest Neighbor Classifiers. In Proc. ICSLP, 2007.

Donoho, Compressed Sensing. IEEE Transactions on Information Theory, 52:1289-1306, 2006.

Halberstat et al. Heterogeneous Measurements and Multiple Classifiers for Speech Recognition. In Proc. ICSLP, 1998.

Ji et al. Bayesian Compressive Sensing. IEEE Transactions on Signal Processing, 56:2346-2356, 2008.

Lamel et al. Speech Database Development: Design and Analysis of the Acoustic-Phonetic Corpus. In Proc. of the DARPA Speech Recognition Workshop, 1986.

Sainath, Applications of Broad Class Knowledge for Noise Robust Speech Recognition. PhD thesis, Massachusetts Institute of Technology, 2009.

Wright et al. Robust Face Recognition via Sparse Representation. IEEE Trans. on PAMI, 31:210-227, 2009.

* cited by examiner

FIG. 1A
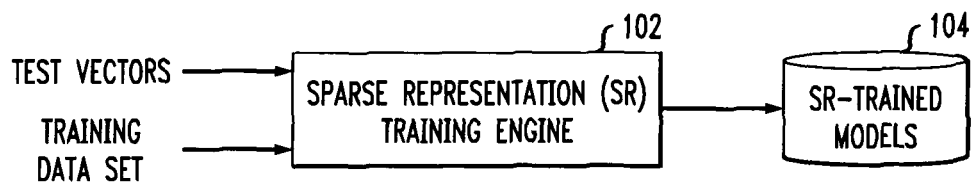
FIG. 1B
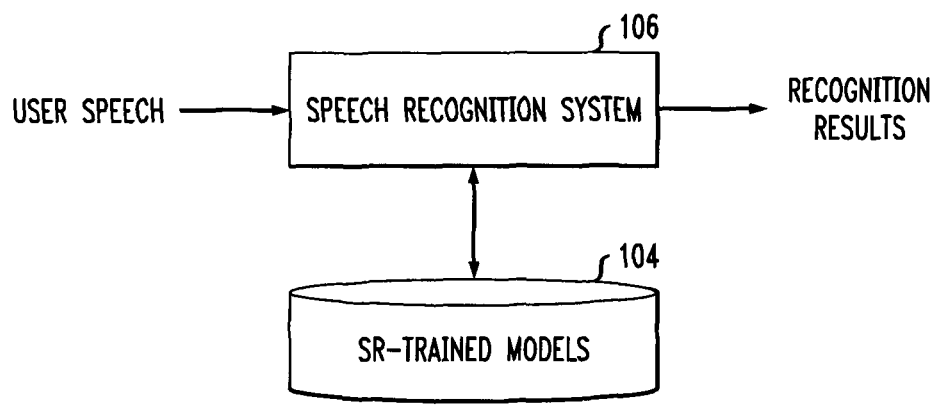
FIG. 2

US 8,484,024 B2

PHONETIC FEATURES FOR SPEECH RECOGNITION

FIELD OF THE INVENTION

The present invention generally relates to speech recognition and, more particularly, to phonetic features.

BACKGROUND OF THE INVENTION

In machine learning theory, problems can be cast in a multi-class regression or classification framework. While the former is the task of decomposing signals into a common basis, the latter is the task of discriminating between different classes. The regression problem reduces to identifying the common sparsity pattern of relevant variables selected from a relatively high-dimensional space. In statistical signal processing, whenever the optimal representation is sufficiently sparse, it can be efficiently computed by convex optimization.

Parametric modeling techniques, such as Gaussian Mixture Models (GMMs) continue to be popular for recognition-type problems in speech recognition. While GMMs allow for fast model training and scoring, training samples are pooled together for parameter estimation, resulting in a loss of information that exists within individual training samples.

Sparse representations (SRs), including methods such as compressive sensing (CS), have become a popular technique for representation and compression of signals. SRs have also been used as a non-parametric classifier for classification tasks. Mathematically speaking, in the SR formulation for classification, a matrix H is constructed including possible examples of the signal, that is $H=[h_1, h_2 \ldots, h_n]$.

Compressive sensing that is used for a signal reconstruction is difficult to apply to speech recognition classification problems because a sensitivity matrix that is constructed from training examples does not have to obey restricted isometry properties.

SUMMARY OF THE INVENTION

Principles of the invention provide techniques for phonetic features for speech recognition.

An exemplary method (which may be computer-implemented) for using phonetic features for speech recognition, according to one aspect of the invention, can include steps of obtaining a first dictionary and a training data set associated with a speech recognition system, computing one or more support parameters from the training data set, transforming the first dictionary into a second dictionary, wherein the second dictionary is a function of one or more phonetic labels of the first dictionary, and using the one or more support parameters to select one or more samples from the second dictionary to create a set of one or more exemplar-based class identification features for a pattern recognition task.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1A illustrates a sparse representation training system, according to an embodiment of the invention;

FIG. 1B illustrates a speech recognition system, according to an embodiment of the invention;

FIG. 2 illustrates $H_{phnid}$ corresponding to H, according to an embodiment of the invention;

DETAILED DESCRIPTION OF PREFERRED EMBODIMENTS

Figure 3:
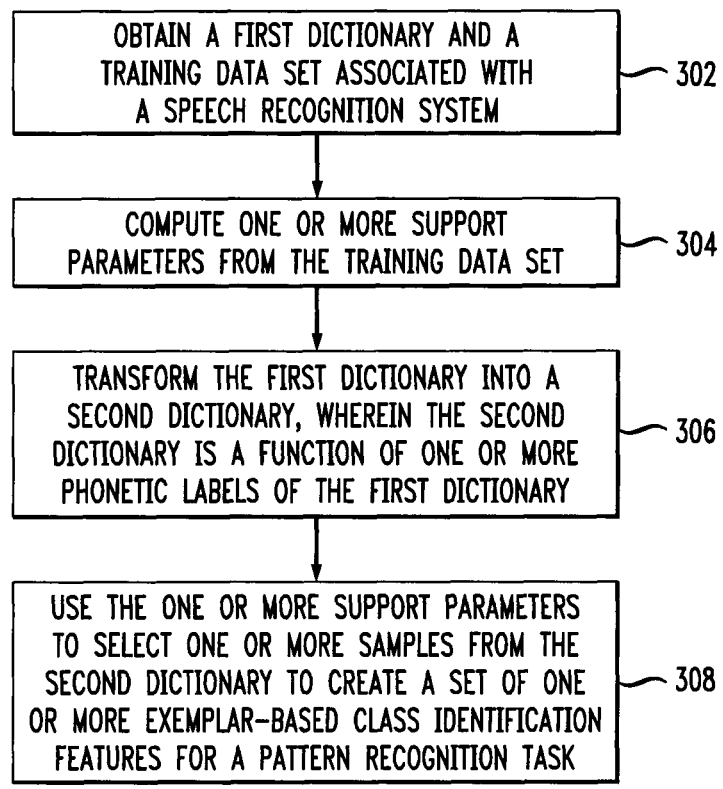
FIG. 3 illustrates a flow diagram illustrating techniques for using phonetic features for speech recognition, according to an embodiment of the invention.

Principles of the present invention will be described herein in the context of illustrative embodiments of methods, apparatus, articles of manufacture, and systems for providing speech recognition functions. It is to be appreciated, however, that the principles of the present invention are not limited to the specific methods, apparatus, articles of manufacture, and systems illustratively shown and described herein. Rather, the principles of the invention are directed broadly to speech recognition techniques, and more specifically to sparse representation phone identification features for speech recognition. For this reason, numerous modifications can be made to the embodiments shown that are within the scope of the present invention. That is, no limitations with respect to the specific embodiments described herein are intended or should be inferred.

Referring initially to FIG. 1A, a sparse representation training system is illustrated according to an embodiment of the invention. As shown, sparse representation (SR) training engine 102 receives one or more test vectors and a training data set. The engine 102 then employs a sparse representation exemplar-based training methodology, as will be explained in detail below, to yield SR-trained acoustic models. The models can be stored in storage 104.

As is known, training data is generally understood to be speech data that is used to initially train the acoustic models, typically in a non-real-time (offline) process. Test data is generally understood to be speech data that is provided to the speech recognition system during real-time (online) decoding or recognition.

FIG. 1B illustrates a speech recognition system according to an embodiment of the invention. It is to be understood that the speech recognition system 106 utilizes the SR-trained acoustic models stored in storage 104 (and generated in accordance with the training engine 102 in FIG. 1A) to decode user speech input to the system 106. This is the actual decoding or recognition task whereby the user's speech is input and decoded to generate a transcription (that is, recognition results) that represents the input speech. It is realized that improved recognition performance is attained via the generation and use of compressive sensing phone identification features for speech recognition according to embodiments of the invention.

While not specifically shown, it is understood that speech recognition system 106 may include front-end processing components such as a speech utterance pre-processor and a feature extractor. The speech utterance pre-processor receives the user speech, typically in the form of testing or real-time utterances, and generates representative speech waveforms (that is, a speech signal). The speech utterance pre-processor may include, for example, an audio transducer (for example, a microphone) and a digital-to-analog converter which respectively operatively transforms the received utterance into an analog electrical signal, and then preferably converts the analog signal into a digital signal representation of the received utterance. Further, the speech utterance pre-processor may sample the speech signal at predetermined intervals and partition the signal into overlapping frames so that each frame can be discretely processed by the remainder of the system. The output signal from the speech utterance pre-processor is the sampled speech waveform or speech signal which is preferably recorded and presented to the feature extractor.

Accordingly, one or more embodiments of the invention include compressive sensing phone identification features for speech recognition. The techniques described herein include an approximate Bayesian compressive sensing (ABCS) formulation that enables the derivation of an iterative closed-form solution for estimating sparseness parameters.

Sparse representation techniques, such as Support Vector Machines (SVMs), k-nearest neighbor (kNN) and Bayesian Compressive Sensing (BCS), can be used to characterize a test sample from a few support training samples in a dictionary set. One or more embodiments of the invention include introducing a semi-gaussian constraint into the BCS formulation, which allows support parameters to be estimated using a closed-form iterative solution. Using this approach for phonetic classification allows for a higher accuracy than other non-parametric techniques. As detailed herein, these phones are the basic units of speech to be recognized. Motivated by this result, one or more embodiments of the invention include the creation and use of a new dictionary that is a function of the phonetic labels of the original dictionary. The support vectors select relevant samples from this new dictionary to create a new representation of the test sample, where the test sample is better linked to the actual units to be recognized.

Equation 1 is solved to find the best $\beta$, where y is a (speaker's) feature vector from the test set, and H is a collection of feature vectors from training.

$$y = H\beta \; s.t. \|\beta\|_1 < \epsilon \qquad (1)$$

SRs are shown to allow for a higher classification accuracy compared to other techniques, implying that $\beta$ is selecting a few appropriate samples from the over-complete dictionary H to represent y. After $\beta$ is computed, the dictionary is changed to be a function of the actual phonetic labels in H. $\beta$ now selects relevant examples from this new dictionary. y is now represented using this new dictionary, referred to herein as Sparse Representation Phone Identification Features ($S_{pif}$).

The new features are better linked to the actual phonetic units to be recognized. Because SR selects appropriate $\beta$ values and provides a higher classification accuracy than a GMM, scoring the $S_{pif}$ vectors, derived from the same $\beta$ values and now linked to phonetic units, with a parametric model produces a higher classification accuracy than the original y features. In turn, higher classification accuracy can correspond to higher recognition accuracy when used in combination with parametric HMM models (or parametric GMM models). Accordingly, one or more embodiments of the invention take advantage of the higher accuracy offered by the SR method to derive a new set of features, while still exploiting the use of the parametric HMM for speech recognition.

Existing techniques for sparse signal recovery commonly utilize convex relaxation methods. However, these techniques require considerable effort to tune the sparseness constraint. Moreover, these methods only provide a point estimate for $\beta$, and can thus be considered to be a sub-optimal solution. Alternatively, an optimization method known as BCS uses a probabilistic framework to estimate the spareness parameters. This technique limits the effort required to tune the sparseness constraint, and also provides complete statistics for the estimate of $\beta$. One or more embodiments of the invention include following a probabilistic formulation similar to BCS and introducing a semi-gaussian prior into this framework, which allows for the derivation of an iterative closed form solution for the sparseness parameters. This technique is referred to herein as approximate Bayesian compressive sensing (ABCS).

Before presenting the ABCS derivation, an intuitive explanation about the characteristics of $\|\beta\|_1^2 = (\Sigma_i |\beta_i|)^2$ and $\|\beta\|_1 = (\Sigma_i |\beta_i|)$ is noted. The semi-gaussian density function can be denoted as proportional to $p_{semi-gauss} \propto \exp(-\|\beta\|_1^2)$ and the laplacian density function proportional to $p_{laplace} \propto \exp(-\|\beta\|_1)$. When $\|\beta\|_1 < 1$, it is straightforward to see that $p_{semi-gauss} > p_{laplace}$. When $\|\beta\|_1 = 1$, the density functions are the same, and when $\|\beta\|_1 > 1$, then $p_{semi-gauss} < p_{laplace}$. Therefore, the semi-gaussian density is more concentrated than the laplacian density in the convex area inside $\|\beta\|_1 < 1$. Given the sparseness constraint $\|\beta\|_q$, as the fractional norm q goes to 0, the density becomes concentrated at the coordinate axes and the problem of solving for $\beta$ becomes a non-convex optimization problem where the reconstructed signal has the least mean-squared-error (MSE). As stated above, the semi-gaussian density has more concentration inside the region $\|\beta\|_1 < 1$. Intuitively, one can expect the solution using the semi-gaussian prior to behave closer to the non-convex solution.

As such, the CS formulation of one or more embodiments of the invention, using the semi-gaussian constraint, similar to Equation 1, is given below:

$$y = H\beta \; s.t. \|\beta\|_1^2 < \epsilon \qquad (2)$$

In Equation 2, y is a sample of data from the test set such that $y \in R^m$ where m is the dimension of feature vector y. H is a matrix of training examples and $H \in R^{m \times n}$, where $m \ll n$.

Assume that y satisfies a linear model as $y = H\beta + \zeta$ where $\zeta \sim N(0, R)$. This allows us to represent $p(y|\beta)$ as a Gaussian:

$$p(y|\beta) \propto \exp(-\tfrac{1}{2}(y - H\beta)^T R^{-1}(y - H\beta)) \qquad (3)$$

Assuming $\beta$ is a random parameter with some prior $p(\beta)$, the maximum a posteriori (MAP) estimate for $\beta$ given y can be obtained as follows: $\beta^* = \arg\max_\beta p(\beta|y) = \max_\beta p(y|\beta)p(\beta)$.

In the ABCS formulation, it is assumed that $p(\beta)$ is actually the product of two density functions, namely a gaussian density function $pG(\beta)$, representing prior belief on) $\beta$, and a semi-gaussian density function $pSG(\beta)$, which represents the sparseness constraint $\|\beta\|_1^2 < \epsilon$. Therefore, the total objective function J, which is preferably maximized to find $\beta$, is given as follows:

$$\beta^* = \arg\max_\beta J = \arg\max_\beta p(y|\beta)pG(\beta)pSG(\beta) \qquad (4)$$

Assume that $pG(\beta)$ is represented as $pG(\beta) = N(\beta | \beta_0, P_0)$. Here $\beta_0$ and $P_0$ are initialized statistical moments. The semi-Gaussian prior, $p_{SG}(\beta)$, as given by Equation 5, imposes sparseness on $\beta$ with $\sigma^2$ controlling the degree of sparseness.

$$p_{SG}(\beta) = \exp\left(-\frac{\|\beta\|_1^2}{2\sigma^2}\right) \qquad (5)$$

Define $\beta^i$ to be the ith entry of the vector $\beta = [\beta^0, \beta^1, \ldots, \beta^n]$. Also, define a vector V with entries set as $V^i(\beta^i) = \text{sign}(\beta^i)$, for $i = 1, \ldots, n$. Here $V^i(\beta^i) = +1$ for $\beta^i > 0$, $V^i(\beta^i) = -1$ for $\beta^i < 0$, and $V^i(\beta^i) = 0$ for $\beta^i = 0$. Using this definition for V, obtain the following:

$$\|\beta\|_1^2 = \left(\left(\sum_i (|\beta^i|)\right)\right)^2 = \left(\sum_i (V^i(\beta^i)\beta^i)\right)^2 = (V\beta)^2 \quad (6)$$

Substituting this expression for $\|\beta\|_1^2$ given in Equation 6 and assuming y=0, Equation 5 can be rewritten as Equation 7 given below, which provides a Gaussian-like representation.

$$p_{SG}(\beta) = p(y=0|\beta) = \exp\left(\frac{-(0-V\beta)^2}{2\sigma^2}\right) \quad (7)$$

Given the dependency of V on β, in order to solve Equation 4, an iterative procedure is introduce that computes V based on the sign of the previously estimated β. Thus, to estimate β at iteration k, we define each entry $V^i(\beta^i) \in V$ as $V^i(\beta^i) \approx V^{i(\beta_{k-1}^i)}$, where k refers to the iteration index. This iteration also requires replacing $\sigma^2$ in Equation 7 by $d \times \sigma^2$, where d is the total number of iterations. Below, further explanation is provided for using the term $d \times \sigma^2$, but for now, define the semi-gaussian at iteration k as:

$$p_{SGd}(\beta) = \exp\left(\frac{-(0-V\beta)^2}{2d\sigma^2}\right) \quad (8)$$

The objective function maximized at each iteration is outlined in Equation 9. First, only the Gaussian constraint is enforced (that is, Equation 9a), and then the semi-gaussian constraint is imposed starting with Equation 9b, for d iterations.

$$J_0(\beta) = p(y|\beta)p_G(\beta) \quad (9a)$$

$$J_1(\beta) = J0(\beta)p_{SGd}(\beta) \quad (9b)$$

$$\ldots$$

$$J_d(\beta) = J_{d-1}(\beta)p_{SGd}(\beta) = J \quad (9c)$$

Using the fact that $\exp(-a/b) = \exp(-a/(b \times d))^d$, taking the product of d exponential products $p_{SGd}$ is equivalent to the true semi-gaussian $p_{SG}$ in Equation 5. This proves that $J_d(\beta)$ in Equation 9c is equivalent to the total objective function J in Equation 4. In addition, this also illustrates why changing the variance in Equation 8 to $d \times \sigma^2$ is equivalent to a true semi-gaussian in Equation 5 with variance $\sigma^2$.

Below is presented a two-step approach to solve for β, which is referred to as the ABCS solution. Step 1 solves for the β, which maximizes Equation 9a. This equation is equivalent to solving y=Hβ without enforcing a sparseness constraint on β. As described herein, a closed form solution can be obtained for β because Equation 9a is represented as the product of two Gaussians. This closed for solution is given more explicitly by Equation 10:

$$\beta^* = \beta_1 = (I - P_0 H^T(HP_0 H^T + R)^{-1} H)\beta_0 + P_0 H^T(HP_0 H^T + R)^{-1} y \quad (10a)$$

Similarly, the variance of $\beta_1$ can be expressed as $P_1 = E[(\beta - \beta^1)(\beta - \beta^1)^T]$, given more explicitly by Equation 10b.

$$P_1 = (I - P_0 H^T(HP_0 H^T + R)^{-1} H)P_0 \quad (10b)$$

Step 1 essentially solved for the pseudo-inverse of y=Hβ, of which there are many solutions. Using the solutions to Step 1 in Equation 10, Equation 9a can be rewritten as another gaussian as $p'(\beta|y) = p(y|\beta)p_G(\beta) = N(\beta|\beta_1, P_1)$. Therefore, the MAP estimate of β can be solved given the sparseness semi-gaussian constraint; in other words:

$$\beta^* = \arg\max_\beta p'(\beta|y)p_{SG}(\beta) \quad (11)$$

Because of the semi-gaussian approximation given in Equation 7, an iterative procedure is used in Step 2 to solve for β and P, as indicated by Equations 9b and 9c. Because the objective function at each iteration can be written as the product of gaussians, as shown by Equation 9c, a closed form solution can be obtained for β and P for each iteration. Equation 12 gives the recursive formula which solves Equation 11 at iteration k, for k>1 to d.

$$\beta_k = \beta_{k-1} - \left[\frac{P_{k-1}V^T}{VP_{k-1}V^T + d \times \sigma^2}\right]V\beta_{k-1} \quad (12a)$$

$$P_k = \left[I - \frac{P_{k-1}V^T}{VP_{k-1}V^T + d \times \sigma^2}\right]P_{k-1} \quad (12b)$$

Thus, the ABCS approach allows for closed-form solution and the complete statistics of β.

Denote $\hat{p}(\beta|y)$ as the posterior pdf obtained by using the ABCS solutions where the approximate semi-gaussian is used. In addition, denote $p(\beta|y)$ as the pdf when the true semi-gaussian is used to estimate β. It can be shown in that for a large number of iterations k, a divergence between the two pdfs is bounded by $O(1/\sigma^2)$.

As detailed herein, a goal of classification is to use training data from k different classes to determine the best class to assign to a test vector y. First, consider taking all training examples $n_i$ from class i and concatenating them into a matrix $H_i$ as columns; in other words $H_i = [x_{i,1}, x_{i,2}, \ldots, x_i, n_i] \in R^{m \times n_i}$, where $x_{i,j} \in R^m$ represents a feature vector from the training set of class i with dimension m. Given sufficient training examples from class i, a test sample y from the same class i can approximately be represented as a linear combination of the entries in $H_i$ weighted by β, that is:

$$y = \beta_{i,1} x_{i,1} + \beta_{i,2} x_{i,2} + \ldots + \beta_{i, n_i} x_{i, n_i} \quad (13)$$

However, because the class membership of a test sample y is unknown, define a matrix H to include training examples from all w classes in the training set; in other words, the columns of H are defined as $H = [H_1, H_2, \ldots, H_w] = [x_{1,1}, x_{1,2}, \ldots, x_w, n_w] \in R^{m \times N}$. Here m is the dimension of each feature vector x and N is the total number of all training examples from all classes. Test vector y can then be represented as a linear combination of all training examples; in other words, y=Hβ. Ideally, the optimal β should be sparse, and only be non-zero for the elements in H which belong to the same class as y. This offers motivation to solve for the sparse representation of β using any SR method, including ABCS.

After using a SR method to solve y=Hβ, assign y to a specific class. Ideally, all nonzero entries of β should correspond to the entries in H with the same class as y. In this ideal case, y will assign itself to training samples from one class in H, and y can be assigned to the class which has the largest support in β. However, due to noise and modeling errors, β might have a non-zero value for more than one class. Therefore, one or more embodiments of the invention include computing the $l_2$ norm for all β entries within a specific class, and choosing the class with the largest $l_2$ norm support.

More specifically, define a selector $\delta i(\beta) \in R^N$ as a vector whose entries are non-zero except for entries in $\beta$ corresponding to class i. The $l_2$ norm can be computed for $\beta$ for class i as $\|\delta i(\beta)\|_2$. The best class for y will be the class in $\beta$ with the largest $l_2$ norm. Mathematically, the best class i* is defined as:

$$i^* = \max_i \|\delta i(\beta)\|_2 \quad (14)$$

As described herein, $\beta$ can be used, from solving the initial y=H$\beta$, to create a new set of $S_{pif}$ vectors. First, define a matrix $H_{phnid} = [p_{1,1}, p_{1,2}, \ldots, p_w, n_w] \in R^{r \times n}$, which has the same number of columns n as the original H matrix (that is, meaning the same number of training examples), but a different number of rows r. Each $p \in R^r$ represents an entry in this matrix $H_{phnid}$. Recall that each sub-matrix $H_i \in H$ contains examples from a specific class. One or more embodiments of the invention can include associating examples from each $H_i$ class with a class index, for example, entries from class $H_0$ belong to index 0, class $H_1$ to index 1, etc. Define each $p \in H_{phnid}$ corresponding to feature vector $x \in H$ to be a vector with zeros everywhere except at the index corresponding to class of x.

FIG. 2 depicts the $H_{phnid}$ corresponding to H, where each $p_i$ becomes a phone identification vector with a value of 1 corresponding to the class of $x_i$. Here, r, the dimension of each p, is equivalent to the total number of classes.

Once $\beta$ is found using SR, one or more embodiments of the invention include using this same $\beta$ to select important classes within the new dictionary $H_{phnid}$, which is derived from the original H dictionary. Specifically, one or more embodiments of the invention include defining a feature vector $S_{pif}$ as $S_{pif} = H_{phnid} \beta^2$, where each element of $\beta$ is squared, that is, $\beta^2 = \{\beta_i^2\}$. Notice the use of $\beta^2$, as this is similar to the $\|\delta j(\beta)\|_2$ classification rule given by Equation 14. This $S_{pif}$ vector is referred to herein as this as a sparse representation phone identification ($S_{pif}$) vector. Each row j of the $S_{pif}$ vector roughly represents the $l_2$ norm of $\beta$ entries for class j.

A speech signal is defined by a series of feature vectors, $Y = \{y^1, y^2 \ldots y^n\}$, for example, Mel-Scale Frequency Cepstral Coefficients (MFCCs). For every test sample $y^t \in Y$, the techniques detailed herein solve $y^t = H^t \beta^t$ to compute a $\beta^t$. Given this $\beta^t$, a corresponding $S_{tpif}$ vector is formed. Thus, a series of $S_{pif}$ vectors is created as $\{S_{pif}^1, S_{pif}^2 \ldots S_{pif}^n\}$. These new vectors take advantage of the non-parametric benefits of SRs, and are used by one or more embodiments of the invention as input features for recognition.

Ideally, H represents a dictionary of all training examples. However, pooling together all training data from all classes into H will make the columns of H large (for example, greater than 2,000,000 for TIMIT), and will make solving for $\beta$ using Equations 10 and 12 intractable. Furthermore, given $H \in R^{m \times N}$, the following condition given by Equation 15 must hold in order for the SR solution of $\beta$ to be sparse. Here, s is the number of non-zero support vectors in $\beta$. For large N, Equation 15 will not hold.

$$m > 2s \log(N) \quad (15)$$

Therefore, to reduce the size of N and make the ABCS problem more practical from an implementation point of view, for each y, one or more embodiments of the invention include finding a neighborhood of closest points to y in the training set using a kd-tree. These k neighbors become the entries of H. k is chosen to be large enough to ensure that $\beta$ is sparse and all training examples are not chosen from the same class, but small enough to ensure that Equation 15 holds.

As described herein, constants $P_0$ and $\beta_0$ must be chosen to initialize the ABCS algorithm. Recall that $\beta_0$ and the diagonal elements of $P_0$ all correspond to a specific class, from H defined above. One or more embodiments of the invention can include, for example, choosing $\beta_0$ to be 0 if one does not have a very confident estimate of $\beta$ and assumes its sparse around 0. Also, it can be chosen to initialize a diagonal $P_0$ where the entries corresponding to a particular class are proportional to the GMM posterior for that class. The intuition behind this is that the larger the entry in the initial $P_0$, the more weight is given to examples in H belonging to this class. Therefore, the GMM posterior picks out the most likely supports, and ABCS refines it further.

The $S_{pif}$ vectors are defined based on the class labels in H. Two example choices of class labels are described herein, although it should be appreciated that other choices can be implemented in one or more embodiments of the invention. First, 49 class labels can be used, which is the exact number of phonemes in TIMIT. Because each phoneme corresponds to one dimension of the $S_{pif}$ vector, a classification error could lead to $\beta$ values from incorrect classes being over-emphasized. Thus some phonemes in the $S_{pif}$ vector might dominate others, leading to potential recognition errors.

To address this issue, one or more embodiments of the invention can also include labeling classes in H by a set of context-independent (CI) HMM states. Specifically, this can include building a 3-state HMM for each of the 49 CI phonemes, giving a total of 3×49=147 states. A first pass recognition is performed to align each sample in the training data to one of the 147 states. While 147 increases the dimension of the $S_{pif}$ vector, the elements in the vector are less sharp now because $\beta$ values for a specific phoneme are more likely to be distributed within each of the CI states of this phoneme.

It is important to ensure a reasonable dynamic range for the $S_{pif}$ vectors. As described herein, one or more embodiments of the invention can include using approaches that ensure numerical stability for practical applications such as phone recognition. For example, because H is constructed using examples from a kd-tree, not all classes are contained in H. This implies that some of the entries in the $S_{pif}$ vectors will be zero. Thus, one or more embodiments of the invention can include smoothing out each entry by perturbing it with a small value sampled randomly from a uniform distribution, thus ensuring that no entry will be 0.

Also, $\beta^t$ at each sample represents a weighting of entries in $H^t$ that best represent test vector $y^t$. This makes it difficult to compare $\beta^t$ values and the $S_{pif}$ vectors across samples, which is necessary for recognition. Therefore, to ensure that the values can be compared across samples, the $S_{pif}$ vectors are normalized at each sample. Thus, the new $S_{pif}^t$ at sample t is computed as $$\frac{S_{pif}^t}{\|S_{pif}^t\|_1}.$$

Recognition experiments were conducted on the TIMIT acoustic phonetic corpus, which contains over 6,300 phonetically rich utterances divided into three sets. The standard NIST training set consists of 3,696 sentences, used to train various models used by the recognizer. The development set is composed of 400 utterances and is used to train various classifier tuning parameters. The full test set includes 944 utterances, while the core test set is a subset of the full test set containing 192 utterances. In accordance with standard experimentation on TIMIT, the 61 phonetic labels are collapsed into a set of 49 for acoustic model training. For testing purposes, the standard practice is to collapse the 49 trained labels into a smaller set of 39 labels, ignoring the glottal stop [q]. All results are reported on the core test set.

One or more embodiments of the invention include using MFCC features as raw features. This feature set is based on an initial spectral analysis that uses 20-ms frames smoothed with a Hamming window and a 5-ms frame step. The final recognition feature set for all example systems described herein were generated by concatenating raw features from nine consecutive frames and projecting to a 40-dimensional feature space using a Linear Discriminative Analysis (LDA) transform. These LDA features were used for both y and H to solve y=Hβ at each frame using ABCS. Once a β is computed for each frame, the phone labels from H are used to construct a new dictionary $H_{phnid}$ and $S_{pif}$ vector, as described herein.

Experiments were conducted to analyze the performance of the $S_{pif}$ vectors. First, by way of example, an analysis of the frame-level accuracy of the SR classifier compared to a GMM and kNN method was performed. The parameters of each classifier were optimized on the development set. Specifically, the number of k closest neighbors for kNN was learned. Also, for SRs, the size of H was optimized to be 200 examples from the kd-tree. This number was chosen to satisfy the SR sparsity relationship in Equation 15, and still have the true class contained in the 200 examples more than 99% of the time.

Also, the performance of $S_{pif}$ for recognition was analyzed, using both CI and Context-Dependent (CD) HMMs. A set of CI HMMs were trained using information from the phonetic transcription. Maximum Likelihood (ML) estimation was used to train parameters of the HMM, and the output distribution of each CI state was a 32-component GMM. The CI models were used for bootstrapping the training of a set of triphone CD ML-trained HMMs. In total, the CD system had 2,400 states and 15,000 Gaussian components, also optimized on the development set, and a trigram language model was used for all experiments. The performance of the CI system using LDA and $S_{pif}$ features was compared, followed by an investigation of the behavior of the CD system with both of these features.

The success of $S_{pif}$ relies, for one, on the fact that the β vectors give large support to correct classes when computing y=Hβ at each frame. Thus, the classification accuracy per frame, computed using Equation 14, should ideally be high. The classification accuracy for the GMM, kNN and ABCS methods were 51.8, 62.1 and 64.0, respectively.

The ABCS technique offers significant improvements over the GMM method, again showing the benefit of the non-parametric ABCS classifier. In addition, ABCS also offers improvements over the kNN, showing the advantages of dynamically adjusting the support vector β per frame.

The phonetic error rate (PER), at the CI level for different features, was observed as follows. The PER for baseline LDA features was 25.9. The PER for $S_{pif}$-49 phones was 25.7. Further, the PER for $S_{pif}$-147 phones was 25.3. Notice that both $S_{pif}$ features outperform LDA features, illustrating the benefit of using a non-parametric technique to derive features with better frame classification accuracy. Notice also that decreasing the sharpness of $S_{pif}$ features by using 147 phones results in a decrease in error rate.

Additionally, the PER at the CD level for LDA and $S_{pif}$ features were 24.9 and 23.9, respectively. Again, the $S_{pif}$ features outperform the LDA features, and a Matched Pairs Sentence Segment Word Error (MPSSWE) test indicates that $S_{pif}$ result is statistically significant. Further, the $S_{pif}$ features offer the best result of all methods at the CD level for ML trained systems. This demonstrates the advantage of using the SR technique to create $S_{pif}$ vectors, which can be used in tandem with the parametric HMM.

As also detailed herein, one or more embodiments of the invention can include obtaining a closed-form solution for β when $J_0$ in Equation 9a is represented as the product of Gaussians. Specifically, $J_0$ can be written as:

$$J_0(\beta)=p(y|\beta)_{p_G}(\beta)=N(y|H\beta,R) \times N(\beta|\beta_0,P_0) \tag{16}$$

Accordingly, $J_0$ can be maximized with respect to β by solving:

$$\frac{\partial \log p(J_0(\beta))}{\partial \beta} = 0 \tag{17}$$

This, in turn, yields:

$$\beta_1=(P_0^{-1}+H^T R^{-1} H)^{-1}[P_0^{-1}\beta_0+H^T R^{-1} y] \tag{18}$$

The term $(P_0^{-1}+H^T R^{-1} H)^{-1}$ requires taking the inverse of an n×n matrix. To reduce inverse computation, using the matrix inversion lemma, this term can be rewritten as:

$$(I-P_0 H^T (HP_0 H^T+R)^{-1} H)P_0 \tag{19}$$

Multiplying Equation 19 by the term $[P_0^{-1}\beta_0+H^T R^{-1} y]$ in Equation 18 gives the following expression for $\beta_1$ after some algebra.

$$\beta^* = \beta_1 = (I-P_0 H^T(HP_0 H^T+R)^{-1}H)\beta_0 + P_0 H^T(HP_0 H^T + R)^{-1} y \tag{20}$$

Accordingly, a closed form solution can be obtained for β assuming that J is the product of Gaussians. In addition, the inverse is computed for an m×m matrix.

FIG. 3 is a flow diagram illustrating techniques for using phonetic features for speech recognition, according to an embodiment of the present invention. Step 302 includes obtaining a first dictionary and a training data set associated with a speech recognition system. This step can be carried out, for example, using one or more modules depicted in FIG. 1A and FIG. 1B and/or described herein. Step 304 includes computing one or more support parameters from the training data set. This step can be carried out, for example, using one or more modules depicted in FIG. 1A and FIG. 1B and/or described herein.

Step 306 includes transforming the first dictionary into a second dictionary, wherein the second dictionary is a function of one or more phonetic labels of the first dictionary. This step can be carried out, for example, using one or more modules depicted in FIG. 1A and FIG. 1B and/or described herein.

Step 308 includes using the one or more support parameters to select one or more samples from the second dictionary to create a set of one or more exemplar-based class identification features for a pattern recognition task. This step can be carried out, for example, using one or more modules depicted in FIG. 1A and FIG. 1B and/or described herein.

Creating a set of exemplar-based class identification features can include solving a sparse representation problem. The sparse representation problem can include, for example, representing a test feature vector as a functional transformation of one or more training examples and learning a set of coefficients for the functional transformation. Additionally, creating the set of exemplar-based class identification features can include weighting this set of coefficients in a transformed sensitivity matrix.

The techniques depicted in FIG. 3 can also include using the set of exemplar-based class identification features to perform a pattern recognition task such as, for example, speech recognition, text classification, speaker recognition, etc. One or more embodiments of the invention can include implementing any sort of classification/recognition task including face recognition, gene recognition, etc. Further, using the set of exemplar-based class identification features to perform a pattern recognition task can include selecting a sensitivity matrix to contain one or more exemplars from the training data set. The sensitivity matrix can include one or more training examples.

Additionally, one or more embodiments of the invention include transforming the sensitivity matrix into a second matrix wherein each sub-matrix (which can be, for example, can be a vector or a group of one or more vectors) in the second matrix contains class identity information about an exemplar from a same sub-matrix of the sensitivity matrix. The class identity for each sub-matrix in the second matrix can be created from the set of indexes corresponding to a class identity in a same sub-matrix in the sensitivity matrix. The indexes corresponding to a class identity in a same sub-matrix can correspond to class labels such as, for example, context-independent phonetic labels, context-dependent phonetic labels, broad phonetic classes, speaker identify, document classes, etc.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1A, 1B, and 3, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1A, 1B, and 3, can also include, as described herein, providing a system, wherein the system includes distinct modules (for example, modules comprising software, hardware or software and hardware). By way of example only, the modules may include, but are not limited to, a sparse representation training engine module, a feature extractor module, a speech recognition engine module, and an acoustic model storage module. These and other modules may be configured, for example, to perform the steps described and illustrated in the context of FIGS. 1A, 1B, and 3.

Figure 4:
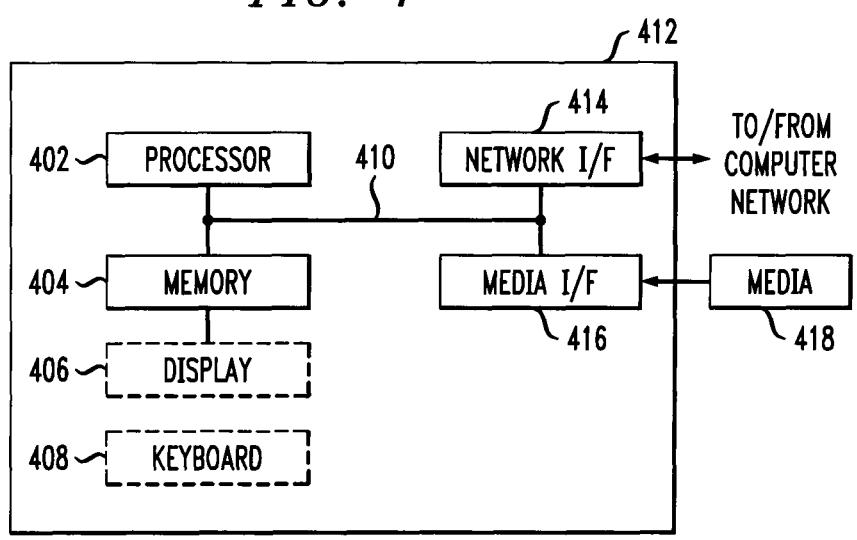
FIG. 4 illustrates a computer system for implementing one or more steps and/or components, in accordance with one or more embodiments of the invention.

One or more embodiments can make use of software running on a general purpose computer or workstation. With reference to FIG. 4, such an implementation 400 employs, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 402, memory 404, and input/output interface such as display 406 and keyboard 408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 408, display 406, pointing device, microphone, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 412 as shown in FIG. 4) running a server program. It will be understood that such a physical server may or may not include a display and keyboard.

At least one embodiment of the invention may provide one or more beneficial effects, such as, for example, using an approximate Bayesian compressive sensing (ABCS) formulation for estimating sparseness parameters to solve problems in speech recognition of a phone.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   obtaining a first dictionary and a training data set associated with a speech recognition system;
   computing one or more support parameters from the training data set;
   transforming the first dictionary into a second dictionary, wherein the second dictionary is a function of one or more phonetic labels of the first dictionary;
   using the one or more support parameters to select one or more samples from the second dictionary to create a set of one or more exemplar-based class identification features for a pattern recognition task; and
   using the set of one or more exemplar-based class identification features to perform a pattern recognition task, said step comprising defining a sensitivity matrix to contain one or more exemplars from the training data set;
   wherein the steps are carried out by a computer device.

2. The method of claim 1, wherein creating a set of one or more exemplar-based class identification features comprises solving a sparse representation problem.

3. The method of claim 2, wherein the sparse representation problem comprises representing a test feature vector as a functional transformation of one or more training examples and learning a set of coefficients for the functional transformation.

4. The method of claim 3, wherein creating the set of one or more exemplar-based class identification features comprises weighting the set of one or more coefficients in a transformed sensitivity matrix.

5. The method of claim 1, wherein using the set of one or more exemplar-based class identification features to perform a pattern recognition task comprises using the set of one or more exemplar-based class identification features for at least one of speech recognition, text classification and speaker recognition.

6. The method of claim 1, wherein the sensitivity matrix comprises one or more training examples.

7. The method of claim 1, further comprising transforming the sensitivity matrix into a second matrix wherein each sub-matrix in the second matrix contains class identity information about an exemplar from a same sub-matrix of the sensitivity matrix.

8. The method of claim 7, wherein the class identity for each sub-matrix in the second matrix is created from a set of one or more indexes corresponding to a class identity in a same sub-matrix in the sensitivity matrix.

9. The method of claim 8, wherein the one or more indexes corresponding to a class identity in a same sub-matrix correspond to one or more class labels.

10. The method of claim 9, wherein the one or more class labels comprise at least one of context-independent phonetic labels, context-dependent phonetic labels, broad phonetic classes, speaker identify, and document classes.

11. The method of claim 7, wherein a sub-matrix can be a vector or a group of one or more vectors.

12. The method of claim 1, further comprising providing a system, wherein the system comprises one or more distinct software modules, each of the one or more distinct software modules being embodied on a tangible computer-readable recordable storage medium, and wherein the one or more distinct software modules comprise a sparse representation training engine module, a feature extractor module, a speech recognition engine module, and an acoustic model storage module executing on a hardware processor.

13. A system, comprising:
a memory; and
a processor operatively coupled to the memory and configured to:
obtain a first dictionary and a training data set associated with a speech recognition system;
compute one or more support parameters from the training data set;
transform the first dictionary into a second dictionary, wherein the second dictionary is a function of one or more phonetic labels of the first dictionary; and
use the one or more support parameters to select one or more samples from the second dictionary to create a set of one or more exemplar-based class identification features for a pattern recognition task; and
use the set of one or more exemplar-based class identification features to perform a pattern recognition task, said step comprising defining a sensitivity matrix to contain one or more exemplars from the training data set.

14. The system of claim 13, wherein the creating a set of one or more exemplar-based class identification features step further comprises solving a sparse representation problem.

15. The system of claim 14, wherein the sparse representation problem comprises representing a test feature vector as a functional transformation of one or more training examples and learning a set of coefficients for the functional transformation.

16. The system of claim 13, wherein the creating the set of one or more exemplar-based class identification features step further comprises weighting the set of one or more coefficients in a transformed sensitivity matrix.

17. The system of claim 13, wherein the using the set of one or more exemplar-based class identification features to perform a pattern recognition task step further comprises using the set of one or more exemplar-based class identification features for at least one of speech recognition, text classification and speaker recognition.

18. The system of claim 13, wherein the processor operatively coupled to the memory is further configured to transform the sensitivity matrix into a second matrix wherein each sub-matrix in the second matrix contains class identity information about an exemplar from a same sub-matrix of the sensitivity matrix.

19. The system of claim 18, wherein the class identity for each sub-matrix in the second matrix is created from a set of one or more indexes corresponding to a class identity in a same sub-matrix in the sensitivity matrix.

20. The system of claim 19, wherein the one or more indexes corresponding to a class identity in a same sub-matrix correspond to one or more class labels.

21. An article of manufacture, comprising a computer readable storage medium having tangibly embodied thereon computer readable program code which, when executed, causes a processor device to:
obtain a first dictionary and a training data set associated with a speech recognition system;
compute one or more support parameters from the training data set;
transform the first dictionary into a second dictionary, wherein the second dictionary is a function of one or more phonetic labels of the first dictionary;
use the one or more support parameters to select one or more samples from the second dictionary to create a set of one or more exemplar-based class identification features for a pattern recognition task; and
use the set of one or more exemplar-based class identification features to perform a pattern recognition task, said step comprising defining a sensitivity matrix to contain one or more exemplars from the training data set.

* * * * *